(12) United States Patent
Lachman

(10) Patent No.: US 10,761,830 B2
(45) Date of Patent: Sep. 1, 2020

(54) METHOD FOR INSTALLING AND UPDATING SOFTWARE PROGRAMS, CORRESPONDING SERVER AND SOFTWARE PACKAGE

(71) Applicant: Winc Solutions B.V., The Hague (NL)

(72) Inventor: Mitchell Danesh Koemar Lachman, The Hague (NL)

(73) Assignee: Winc Solutions B.V., The Hague (NL)

( * ) Notice: Subject to any disclaimer, the term of this patent is extended or adjusted under 35 U.S.C. 154(b) by 0 days.

(21) Appl. No.: 16/095,566

(22) PCT Filed: Apr. 21, 2017

(86) PCT No.: PCT/NL2017/050259
§ 371 (c)(1),
(2) Date: Oct. 22, 2018

(87) PCT Pub. No.: WO2017/183983
PCT Pub. Date: Oct. 26, 2017

(65) Prior Publication Data
US 2019/0087170 A1    Mar. 21, 2019

(30) Foreign Application Priority Data

Apr. 22, 2016   (NL) .................................... 2016667

(51) Int. Cl.
*G06F 8/61* (2018.01)
*G06F 8/65* (2018.01)
*H04L 29/08* (2006.01)

(52) U.S. Cl.
CPC .................. *G06F 8/65* (2013.01); *G06F 8/61* (2013.01); *H04L 67/34* (2013.01)

(58) Field of Classification Search
None
See application file for complete search history.

(56) References Cited

U.S. PATENT DOCUMENTS 5,835,777 A     11/1998   Staelin
2005/0091192 A1*  4/2005  Probert ..................... G06F 8/62
(Continued)

FOREIGN PATENT DOCUMENTS

EP          1724682 A1    11/2006

*Primary Examiner* — Philip Wang
(74) *Attorney, Agent, or Firm* — Jeffrey D. Shewchuk; Shewchuk IP Services, LLC

(57) ABSTRACT

Web portal software presents a GUI for installing and updating software applications on a computer. A method of using the GUI includes steps of: (a) specifying the configuration of an end user computer, (b) selecting on the GUI a software application program, (c) downloading a software package containing said selected software application program and arranged for the specified configuration, and (d) installing the software program by executing the software package. If the selected software package is not available for the specified configuration, step (c) is preceded by (e) the supplier creating a software package arranged for installing the software program on a computer having the specified configuration. The specified configuration may comprise an operating system type, a processor type, software application programs already installed on the end user computer, and/or a required dynamic link library, a registry entry, and a required parameter name in computer files.

16 Claims, 3 Drawing Sheets

(56) References Cited

U.S. PATENT DOCUMENTS

Figure 1:
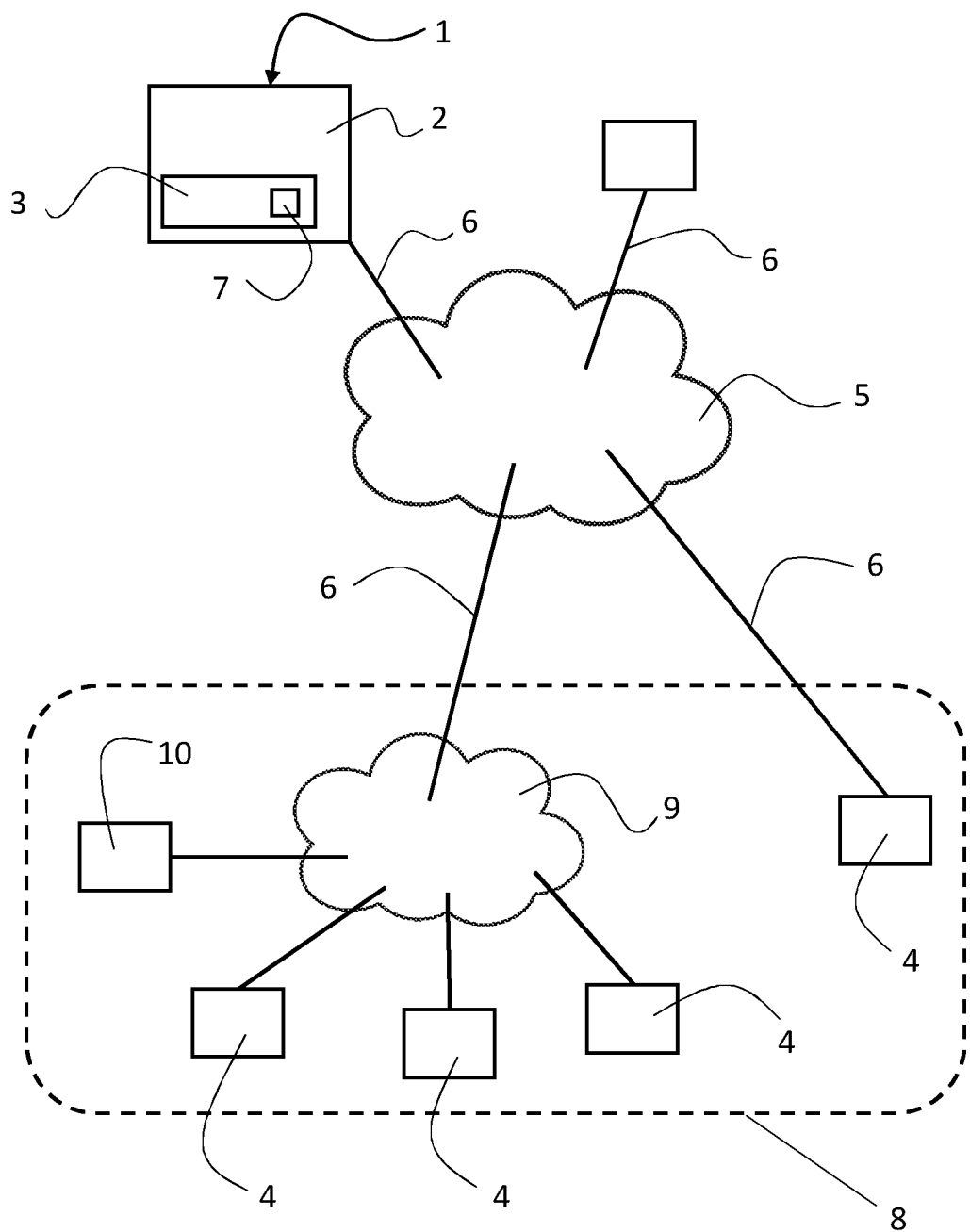

| | | | |
|---|---|---|---|
| 2006/0123414 A1 | 6/2006 | Fors et al. | |
| 2007/0169114 A1* | 7/2007 | Birk Olsen | G06F 8/61 717/174 |
| 2009/0094596 A1* | 4/2009 | Kuiper | G06F 8/61 717/174 |
| 2011/0113425 A1* | 5/2011 | Tuttle | G06F 8/61 717/178 |
| 2011/0265080 A1* | 10/2011 | Matthew | G06F 8/61 717/176 |
| 2013/0132942 A1* | 5/2013 | Wang | G06F 8/61 717/176 |
| 2016/0291952 A1* | 10/2016 | Velasco | G06F 8/61 |

\* cited by examiner

Fig. 3

| | | | | | | |
|---|---|---|---|---|---|---|
| Dashboard | PACKAGE STORE | | | | | |
| My packages | | | | | | |
| Package Store | Show 10 entries | | | | Search | |
| Scrum Board | | | | | | |
| Reseller | Product Name | Type | Architect | Credit Cost | Status | |
| Dashboard | ADOBE ACROBAT 7.0 | MSI | X86 | 10 credits | PURCHASED | |
| Manage Clients | ADOBE ITUNES 11.1 | App-V | X64 | 15 credits | NEW PACKAGE | |
| Customer Activity | ADOBE PHOTOSHOP CS4 | App-V | X86 | 10 credits | PURCHASED MANAGED | |
| Buy Credits | ADOBE PHOTOSHOP CS5 | App-V | X86 | 10 credits | PURCHASED MANAGED | |
| Employees | ADOBE PHOTOSHOP CS6 | App-V | X86 | 10 credits | PURCHASED MANAGED | |
| Worklist | IGOR PAVLOC 7ZIP 9.20 | App-V | X64 | 10 credits | PURCHASED | |

Fig. 4

| TO DO | IN PROGRESS | READY FOR TEST | DONE |
|---|---|---|---|
| ACROBAT 8.0 PRO<br>This is a multiline test by Mitchell<br>Created by: Bob Steefkerk | WINRAR 5.20  R<br>This is a multiline test. By Mitchell<br>Assignee: Mitchell Lachman | | CHROME 34.0<br>This is a multiline test. By Mitchell<br>Approved by: Mitchell Lachmann |
| 7ZIP 9.20<br>This is a multiline test. By Mitchell<br>Created by: Bob Steefkerk | PHOTOSHOP CS6<br>This is a multiline test. By Mitchell<br>Assignee: Mitchell Lachman | | |
| DREAMWEAVER 7<br>This is a multiline test. By Mitchell<br>Created by: Bob Steefkerk | | | |

METHOD FOR INSTALLING AND UPDATING SOFTWARE PROGRAMS, CORRESPONDING SERVER AND SOFTWARE PACKAGE

The invention relates to a method for installing and updating software programs, in particular a method according to the preamble of claim 1.

A software package typically comprises a software program and program code that, when executed, installs the software program on a computer, or updates the installation.

A disadvantage of the known method of the type mentioned above is that often still substantial handwork and specific computer system knowledge are required for a proper installation.

This disadvantage is also observed in the updating of installed software programs; updates also have to be adapted to the specific computers of end users and hence also require substantial handwork and specific knowledge. Updates are becoming more frequent, among other things for treating security issues that arise over time and other issues resulting from the ongoing development and use of the internet. Thus, a need exists for improved installation and updating.

A goal of the invention is to provide a method according to the preamble that is improved, in particular in the sense that the successful installation and/or updating of software programs require less effort.

This goal is reached by a method according to claim 1. The method is configured for installing and updating software applications on an end user computer, in a system comprising a server of a software supplier and a multitude of end user computers, on the server software packages are available for downloading and installing a software application on the end user computer. The method comprising the steps of:
a) the end user computer downloading from the server a software package of a software application;
b) installing the software program on said end user computer by executing the software package, wherein on the server web portal software is running that presents a GUI on an end user computer, on the server is available a supported-configuration database comprising configuration information of end user computers, which configuration information defines which software packages of a particular software application are available for which specific computer configuration of an end user computer. The method further comprising the steps of:
c) providing to the server a specific configuration of an end user computer,
d) a user selecting on said web portal GUI a software application program,
e) the server checking in the supported-configurations database if a software package of the selected software application program is available for the specified configuration, and, if the outcome of the check is that the selected software package is not available for the specified configuration, then executing the step of (f) the server sending a message to the supplier to create a software package arranged for installing the software program on a computer having the specified configuration and if the outcome of the check is that the selected software package is available the server enabling the user to download from the server the software package of the selected software application program for the specific configuration of the end user computer.

By creating a software package for the selected software program and the specified configuration, on demand, it becomes possible to obtain a software package that is tailored to the configuration of the specific computer without the need for the software supplier to create packages for all possible configurations, and without the need for the end user, or the ICT specialist supporting her, to manually adapt the installation.

The invention makes it possible to install or update the selected software package properly without destroying or corrupting existing installations of other software on the end user computer even for specific configurations (as frequently happens with software packages known in the prior art), with less effort.

The method according to the invention requires less effort for the end user, since the work for the installation and/or updating is now moved to the producer of the package, who makes certain that the package contains the right files, and the right scripts and other instructions for making the necessary changes in the computer where the package is installed. In larger organizations, this advantage is multiplied, since usually a large number of computers is present, having various different configurations, depending on both the hardware of the computer and the installed software.

The installation and/or updating of the software package also requires less effort in total, since the producer has specialized knowledge and/or personnel for this task and only needs to make packages that are demanded.

The reduced required effort also allows for a reduced amount of time for deployment of software.

It is noted that after the creation on demand of the specified software package, it is advantageously stored, and its configuration information is stored in the supported-configuration database, and offered via the web portal GUI (Graphical User Interface), so that it needs to be created only once.

Further, it is noted that the steps (a) and (b) may also be done in the reverse order, hence first (b) then (a).

The terms "supplier" and "user" or "end user" in this document refer to a person or organization offering software application programs, such as a producer or seller or reseller, respectively to a person or organization downloading software for use on her or its computers. An end user will often be an employee of an organization, an a user will often be an ICT person of the organization, and may also be another person such as an employee who is not primarily responsible for ICT and uses the downloaded software.

The term "supported-configurations database" refers to an ordered data collection, for example a relational database system, or a plain text file.

In advantageous embodiments, the specified configuration comprises (a) an operating system type, or (b) a processor type. These are relatively simple yet effective ways of distinguishing configurations.

Alternatively, or in addition to this, the specified configuration may also comprise (c) at least one software application program already installed on the end user computer, and preferably in addition to (c) possibly at least one of a required dynamic link library, a registry entry, and a required parameter name in computer files, as necessary for the proper operation of at least one software application program already installed on the end user computer. By such additional configuration information, it becomes possible to create the software package such that it not only installs the selected software program properly, but also ascertains that other software programs already installed on the computer remain operating as they did before. Thus, they do not suddenly fail to start up, or crash more often or show otherwise changed behavior.

In an advantageous embodiment, the step (c) of specifying the configuration of an end user computer is extended by specifying requirements for additional functionalities or features of the selected software program, and the step of creating a software package is extended to arrange the package for meeting the requirements defined in the step (c) of specifying.

An example of a requirement for a feature is the maximal allowable use of working memory by the installed software program.

By such specification, it becomes possible to tailor the software package even further to the end user's specific configuration and/or needs.

The step (c) of specifying may be done manually, being straightforward and simple but requiring some computer knowledge.

Alternatively, the step (c) of specifying may be done with the aid of a snapshot tool, by creating a snapshot of the end user computer configuration before installation and analyzing the snapshot for aiding in the creation of an appropriate package. This may be done on the actual end user computer, or on a virtualized machine having the same configuration as specified.

This allows for an automated determination of the configuration of the end user computer, at least partially, without the end user or his system registrator having to input this manually, and with a lower risk of errors.

The combination of making a snapshot and specifying further requirements, as claimed above, is particularly efficient.

Further, if, after installation, another snapshot is made and used for checking if the installation was done successful, it becomes easier to further reduce the amount of errors.

Advantageously, the step of creating a package comprises showing to the supplier a "scrum board", being a GUI that comprises two or more development stages of the process of creating at least the selected the software package. Scrum boards are well known in the field of software engineering, in particular agile software development, and typically comprise a "to do" list, in the present case a list containing at least the selected software package and possibly other software packages to be created, and for each item a few creation stages, such as for example "in progress", "ready for testing", and "done". The scrum board, when integrated with the web portal, reduces the amount of administrative effort the supplier would have to do when the scrum board was in a separate software program. It also allows for increased speed of creating the software package, by having the required information readily at hand. When the scrum board is shown to the end user, on demand, she will gain more insight in when the required software package will be delivered and thus may adapt her planning, and use her time more efficiently.

If the web portal software also comprises a registration of all software packages already downloaded by the end user, and the method also comprises the step of showing said registration in the web portal, along with the availability of packages updates for packages of installed downloaded software programs, then the installation and updating require even less effort.

The web portal software may be adapted to allow a reseller to offer software packages, by showing an adapted GUI carrying the name of the reseller and by an adaptation of the database for storing orders for the reseller. This takes away the need for resellers to build their own web portal software with the advantages of the invention, by allowing to use, or reuse, the web portal software of the supplier with only a modified "face" or "look" to identify themselves.

The invention further relates to a method according to the preamble, and having the same goal as defined above, having the characterizing features of claim 15, and a corresponding software package according to claim 16. Specifically, claim 15 involves a method for installing and updating software applications on a computer, in a system comprising a server of a software supplier on which server web portal software is running that presents a GUI to an end user, and comprises a supported-configuration database for storing configuration information related to software packages available for downloading via said web portal GUI, the method comprising the steps of: (a) specifying the configuration of an end user computer, (b) a user selecting on said web portal GUI a software application program, (c) downloading a software package containing said selected software application program and arranged for the specified configuration, (d) installing the software program on said end user computer by executing the software package, characterized in that the specified configuration comprises at least one software application program already installed on the end user computer, and at least one of a required dynamic link library, a registry entry, and a required parameter name in computer files, as necessary for the proper operation of at least one software application program already installed on the end user computer. Claim 16 involves a software package that, when executed, installs a software program on a computer having a predefined computer configuration, wherein the predefined computer configuration comprises at least one software application program already installed on the end user computer and at least one of a required dynamic link library, a registry entry, and a required parameter name in computer files, as necessary for the proper operation of the at least one software application program already installed on the end user computer. In these two claims, the inventive step consists of using specific configuration information in creating a software package to be installed, also when not on demand but in advance, with the advantage that it becomes possible to create a software package such that it not only installs the selected software program properly, but also ascertains that other software programs already installed on the computer remain operating as they did before. Thus, they do not suddenly fail to start up, or crash more often or show otherwise changed behavior.

Figure 2:
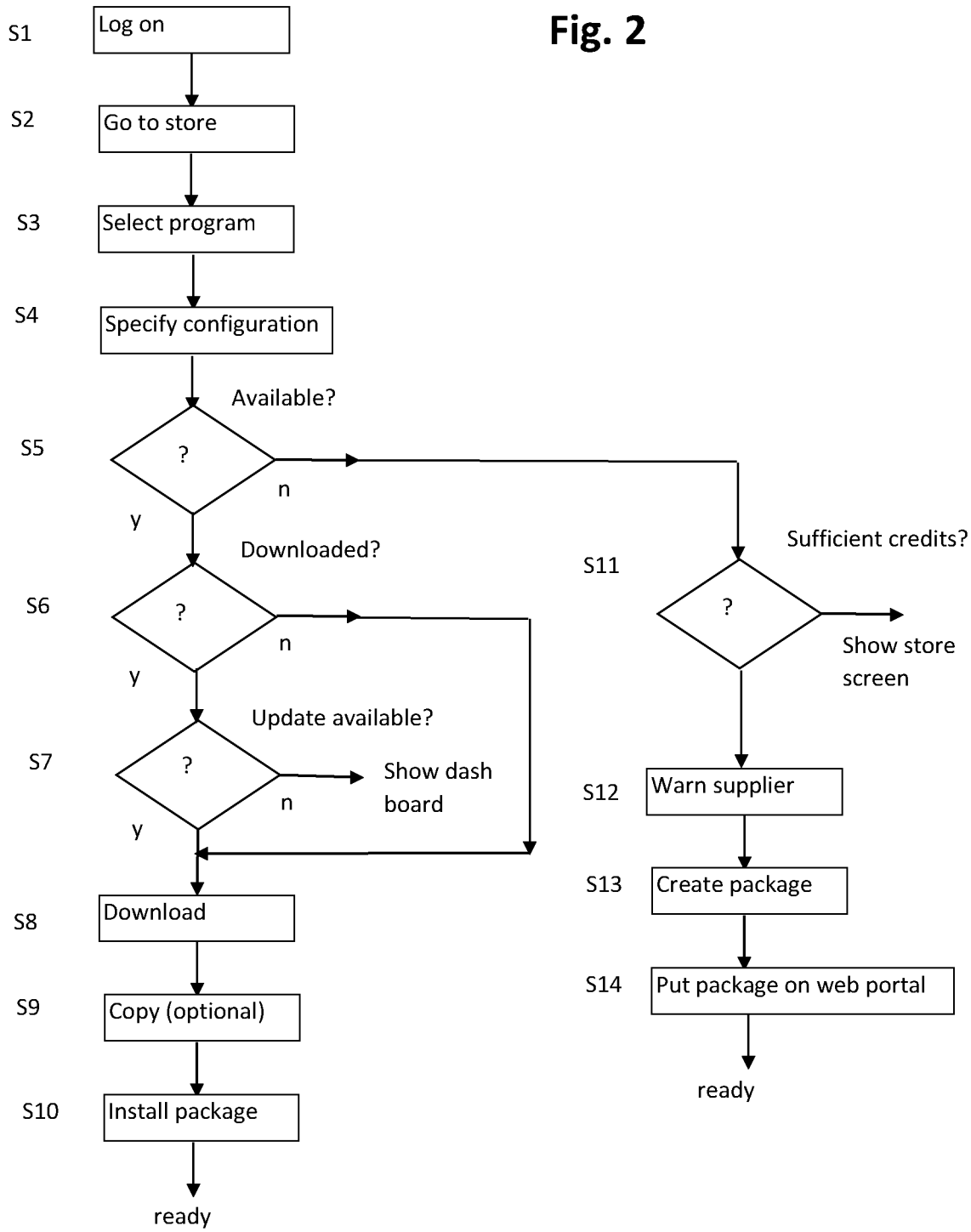

The invention will now be illustrated by means of an example, referring to the accompanying figures, in which:

FIG. 1 shows an embodiment of a system on which a method according to the invention is executed, FIG. 2 shows a flow diagram of an embodiment of a method according to the invention, FIG. 3 shows the web portal GUI used in the method of FIG. 2 with a GUI screen of the web portal used in the method, FIG. 4 shows a scrum board as used in the method of FIG. 2.

In FIG. 1, a system 1 comprises a server computer 2 (or several computers functioning as a virtual computer), owned and managed by a software vendor or supplier. The server computer 2 has web portal software 3 running on a Windows operating system that serves as a web portal for an end user computer 4 who has logged on via the internet 5 and data communication links 6.

The web portal software 3 shows a GUI on the end user computer 4 when she is logged on. Part of the web portal software 3 is a supported-configuration database 7, in this example managed by an RDBMS (Relational Data Base Management System) in the web portal software 3.

On the web portal, an end user computer 4 is allowed to download software packages stored on the server, either physically or virtually, under conditions. The supported-configurations database contains data that describes for each software package downloadable via the web portal for which computer configuration it is arranged, in other words, which computer configuration is needed for the software package to install and/or update successfully without the need for adjustments after installation.

The end user computers 4 are located in an organization 8, such as a hospital or insurance company, or a bicycle manufacturing company, and are connected either directly to the internet 5, or indirectly, via an intranet 9. Also part of the organization is a server computer 10, used as a file server for the organization and for managing software on the end user computers 4.

The web portal software 3 is arranged to execute the method of the invention, when run on the server 2, as shown in FIG. 2.

In FIG. 2, the method of the invention is shown, in this example comprising the following steps. In step 1, a person of the organization 8 logs on to the web portal program 3. In this example the person is an ICT-employee at an end user computer 4.

The web portal program shows a dashboard 12 (See FIG. 3), i.e. a number of buttons each leading to a specific screen to be shown, and specific further actions to be allowed. In step s2, the person chooses the screen "package store" which screen (see FIG. 3) shows the packages already downloaded by the organization of the person, including an indication of the computer configurations for which the program was downloaded.

Then, when the person sees that the software package was not downloaded yet, she may select a software program in step s3 and specify the configuration of the computer on which the program will have to run (step 4). The specification is done on a pop-up screen (not shown), and in this example it includes the target platform, i.e. the computer type on which the package will be installed, in terms of processor type (32 bit, or 64 bit etc) the amount of memory installed, and other software programs already installed, available on the screen on a list based on the supported-configurations database. Additionally, a free-text field is available on the pop-up screen for allowing the user to specify requirements for additional features and/or functions. Alternatively, the free-text field may be replaced by a predefined list.

The web portal software 3 now checks in the supported-configurations database 7 if the selected software program is available for the specified configuration (step s5). If so, it checks if it was already downloaded. If not, it downloads (step s8) the update to the organization file server computer 10, after which the person optionally copies the package to the relevant end user computers (s9), and starts the automated installation by executing the software package (s10). In some cases the software package is not copied to an end user computer, but instead installed directly on the organization's server computer 10, from where it runs in a virtualized mode and is used and commanded from the end user computer 4. In such a case, the server is considered the end user computer, and the relevant configuration information for the package is that of the server, or the server portion reserved for the corresponding end user computer 4.

If in step s6 the outcome is "yes", then a check is done for the presence of an update, i.e. a newer version of the software program or package. If so, the steps s8-s10 are executed.

If in step s5 the program appears not to be available, it is checked if the organization still has sufficient credits (step s11). If the outcome is "yes", then the supplier is warned, in other words, informed, that a software package should be created (step s12), arranged for installing the software program on a computer having the specified configuration, by putting the package as a to do item on a scrum board 13, shown in FIG. 4, and also by sending an email alert to the supplier.

In step s13 the package is created, using the scrum board and by creating a virtualized computer having the specified configuration, then taking a snapshot of that virtual computer, including the registry, contents of the .ini-file (a file containing settings for computer programs), processor types and numbers, installed memory, and program files. The actual creation and testing, in step s13, are done by persons of the supplier or by persons in service of the supplier, and testing is done with the aid of another snapshot of the virtual computer.

During the creation of the software package, the supplier may and usually will add details to the specified configuration information, that go beyond the knowledge of the typical end user, such as information on the registry contents, required dlls (dynamic link libraries), parameter names in the .ini-file or in other files needed for proper operation of the package on the end user computer (virtual or real) and file names. This is not shown in FIG. 2.

The testing of the package also comprises the use of another snapshot, in this case of the computer after installation (also not shown).

Then in step s14, the software package is put on the web portal, ready for downloading, and sending an alert to the user/person.

The person, who went to another screen or may have logged out in the meanwhile, goes to the store again (s2), and selects the program again (now indicated as ready for download, and preselected by the portal program), specifies the configuration (by inspecting, possibly correcting, and approving information retrieved from the former session and shown by the portal program) in step s4, passes the test of step s5 since the package is now available, fails the test of step s6 and then downloads the software package created on demand, step s8 and continues with optional copying step s9 and installation in step s10.

After that, the person either logs out of the web portal or selects another screen.

In FIG. 3, the package store screen 11 is shown next to the dashboard 12. On the store screen 11, each line represents a software package. Each line mentions the name of the software program in the software package, the type of application (virtualized or not and what type of virtualization), the architecture of the computer on which the package will be installed, and how much the package costs, in terms of a unit called "credit". Further, the screen shows the status of the package, in terms of already purchased ("purchased"), not yet purchased ("new package") and additionally for purchased packages also if they were downloaded, possibly after creation ("managed").

In FIG. 4, the scrum board 13 screen (the dashboard of FIG. 3 is to its left, but not shown in FIG. 4), shows tasks in terms of software program names to be put into software packages, e.g. "ACROBAT 8.0 PRO". The screen is divided from left to right into four columns, each representing a stage of completion: the leftmost column contains tasks yet to start ("to do"), the rightmost column contains tasks that are done, ready. This scrum board is available to the user as well as the supplier, in this example.

The above example serves for illustrative purposes only. It will be clear to the person skilled in the art that various modifications are possible without leaving the scope of the claims. For example, instead of computers running a version of the Windows operating system, Android or Apple operating systems could be used. Moreover, the server computer 10 in the organization could be dismissed, and a snapshot for determining a computer configuration and/or the proper installation may also be made on the actual end user computer on which the software package is installed instead of on a virtualized computer.

The invention claimed is:

1. Method for installing and updating software applications on an end user computer,
in a system comprising a server of a software supplier and a multitude of end user computers, on the server software packages are available for downloading and installing a software application on the end user computer;
the method comprising the steps of:
(a) the end user computer downloading from the server a software package of a software application;
(b) installing the software program on said end user computer by executing the software package,
characterized in that
on the server web portal software is running that presents a GUI on an end user computer, on the server is available a supported-configuration database comprising configuration information of end user computers, which configuration information defines which software packages of a particular software application are available for which specific computer configuration of an end user computer,
the method further comprising the steps of:
(c) providing to the server a specific configuration of an end user computer,
(d) a user selecting on said web portal GUI a software application program,
(e) the server checking in the supported-configurations database if a software package of the selected software application program is available for the specified configuration, and,
if the outcome of the check is that the selected software package is not available for the specified configuration, then executing the step of
(f) the server sending a message to the supplier to create a software package arranged for installing the software program on a computer having the specified configuration and if the outcome of the check is that the selected software package is available the server enabling the user to download from the server the software package of the selected software application program for the specific configuration of the end user computer.

2. Method according to claim 1, wherein the specified configuration comprises an operating system type.

3. Method according to claim 1, wherein the specified configuration comprises a processor type.

4. Method according to claim 1, wherein the specified configuration comprises at least one software application program already installed on the end user computer.

5. Method according to claim 4, wherein the specified configuration comprises on at least one of a required dynamic link library, a registry entry, and a required parameter name in computer files, as necessary for the proper operation of at least one software application program already installed on the end user computer.

6. Method according to claim 1, wherein
the step (c) of specifying the configuration of an end user computer is extended by specifying requirements for additional functionalities or features of the selected software program, and
the step of creating a software package is extended to arrange the package for meeting the requirements defined in the step (c) of specifying.

7. Method according to claim 1, wherein the step (c) of specifying is done manually.

8. Method according to claim 1, wherein the step (c) of specifying is done with the aid of a snapshot tool, by creating a snapshot of the end user computer configuration before installation and analyzing the snapshot for aiding in the creation of an appropriate package.

9. Method according to claim 8, wherein, after installation, another snapshot is made and used for checking if the installation was done successful.

10. Method according to claim 1, wherein the step of creating a package comprises showing to the supplier a "scrum board", being a GUI screen that comprises two or more development stages of the process of creating at least the selected software package.

11. Method according to claim 10, wherein the scrum board is shown to the end user, on demand of the user.

12. Method according to claim 1, wherein the web portal software also comprises a registration of all software packages already downloaded by the end user, the method also comprising the step of showing said registration in the web portal, along with the availability of packages updates for packages of installed downloaded software programs.

13. Method according to claim 1, wherein the web portal software is adapted to allow a reseller to offer software packages, by showing an adapted GUI carrying the name of the reseller and by an adaptation of the database for storing orders for the reseller.

14. Server computer connected via a communications network to one or more client computers, the server computer comprising software that, when executed, runs a web portal program and causes the server to perform the method according to claim 1.

15. Method according to claim 1,
characterized in that
the specified configuration comprises at least one software application program already installed on the end user computer, and at least one of a required dynamic link library, a registry entry, and a required parameter name in computer files, as necessary for the proper operation of at least one software application program already installed on the end user computer.

16. Method according to claim 1, characterized in that in step b) of installing the software program the software package installs the software program on the end user computer having a predefined computer configuration, wherein the predefined computer configuration comprises at least one software application program already installed on the end user computer and at least one of a required dynamic link library, a registry entry, and a required parameter name in computer files, as necessary for the proper operation of the at least one software application program already installed on the end user computer.

* * * * *